United States Patent [19]
Guerra et al.

[11] Patent Number: 5,860,563
[45] Date of Patent: Jan. 19, 1999

[54] MEDICINE VIAL DISPENSER

[75] Inventors: Lawrence E. Guerra, Roeland Park; Keith W. Kudera, Merriam; Clayton Mehnert, Lawrence, all of Kans.

[73] Assignee: Scriptpro, LLC, Mission, Kans.

[21] Appl. No.: 880,211

[22] Filed: Jun. 23, 1997

[51] Int. Cl.[6] .................................................. B65G 59/00
[52] U.S. Cl. ......................... 221/172; 221/196; 221/266; 221/281
[58] Field of Search .................................... 221/171, 172, 221/194, 195, 196, 266, 281

[56] References Cited

U.S. PATENT DOCUMENTS

| 341,045 | 11/1886 | Igel et al. ................................. 221/171 |
| 3,166,177 | 1/1965 | Laverty .................................... 221/172 |
| 5,337,919 | 8/1994 | Spaulding et al. . | |

FOREIGN PATENT DOCUMENTS 1449591  8/1966  France ................................... 221/172

*Primary Examiner*—H. Grant Skaggs
*Attorney, Agent, or Firm*—Hovey, Williams, Timmons & Collins

[57] ABSTRACT

A medicine vial dispensing apparatus includes a housing for storing medicine vials in a substantially axially horizontal storage orientation and a dispensing assembly for dispensing the vials in an upright orientation. The preferred embodiment includes a pair of spaced, resilient arms having respective, inwardly extending prongs that receive a vial therebetween. A slotted, rotating wheel receives a vial in the storage orientation and places it between the prongs. The closed end of the vial slips by one of the prongs while the other prong holds the interior surface of the open end until the vial attains a substantially upright orientation.

8 Claims, 4 Drawing Sheets

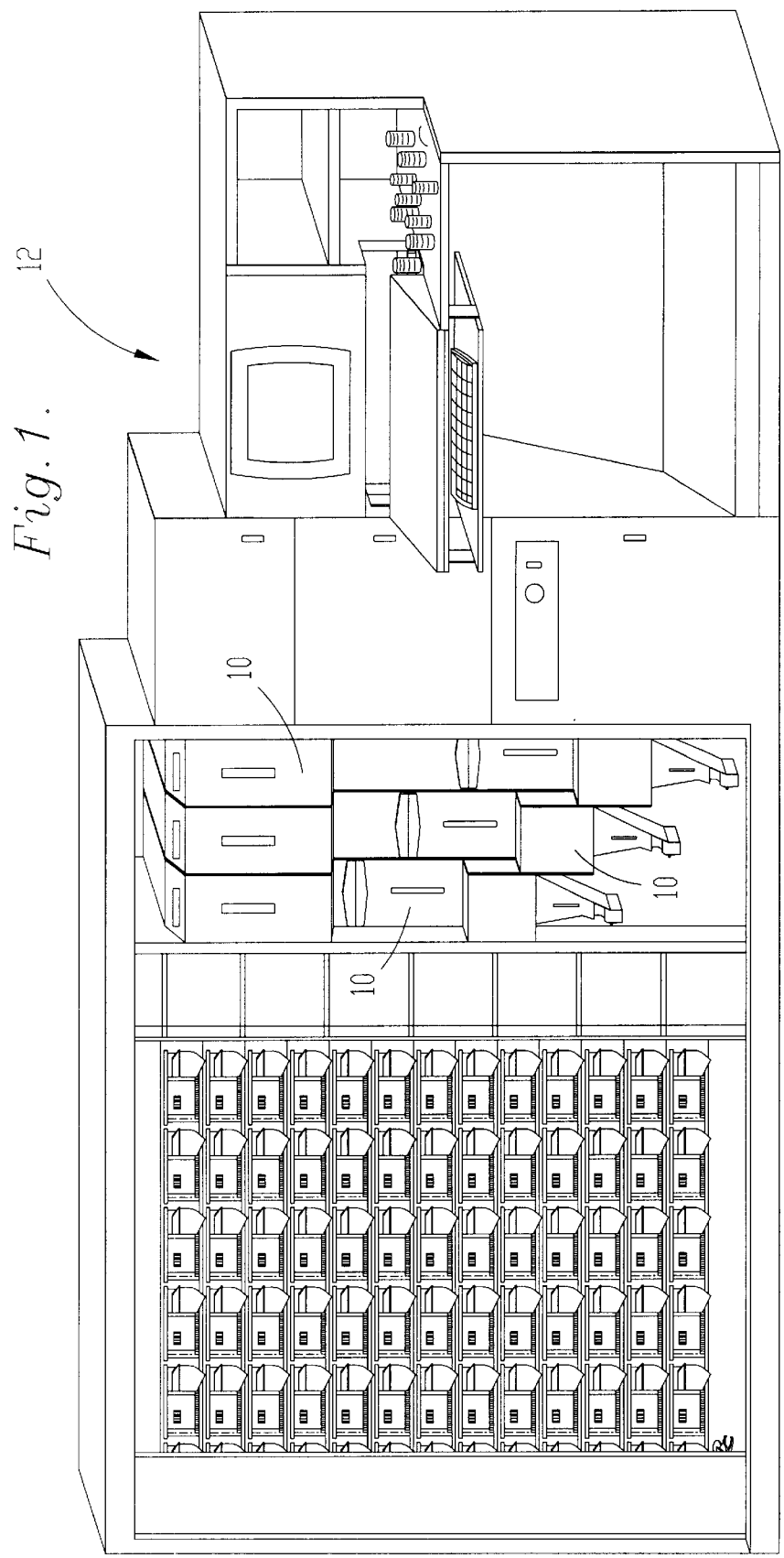

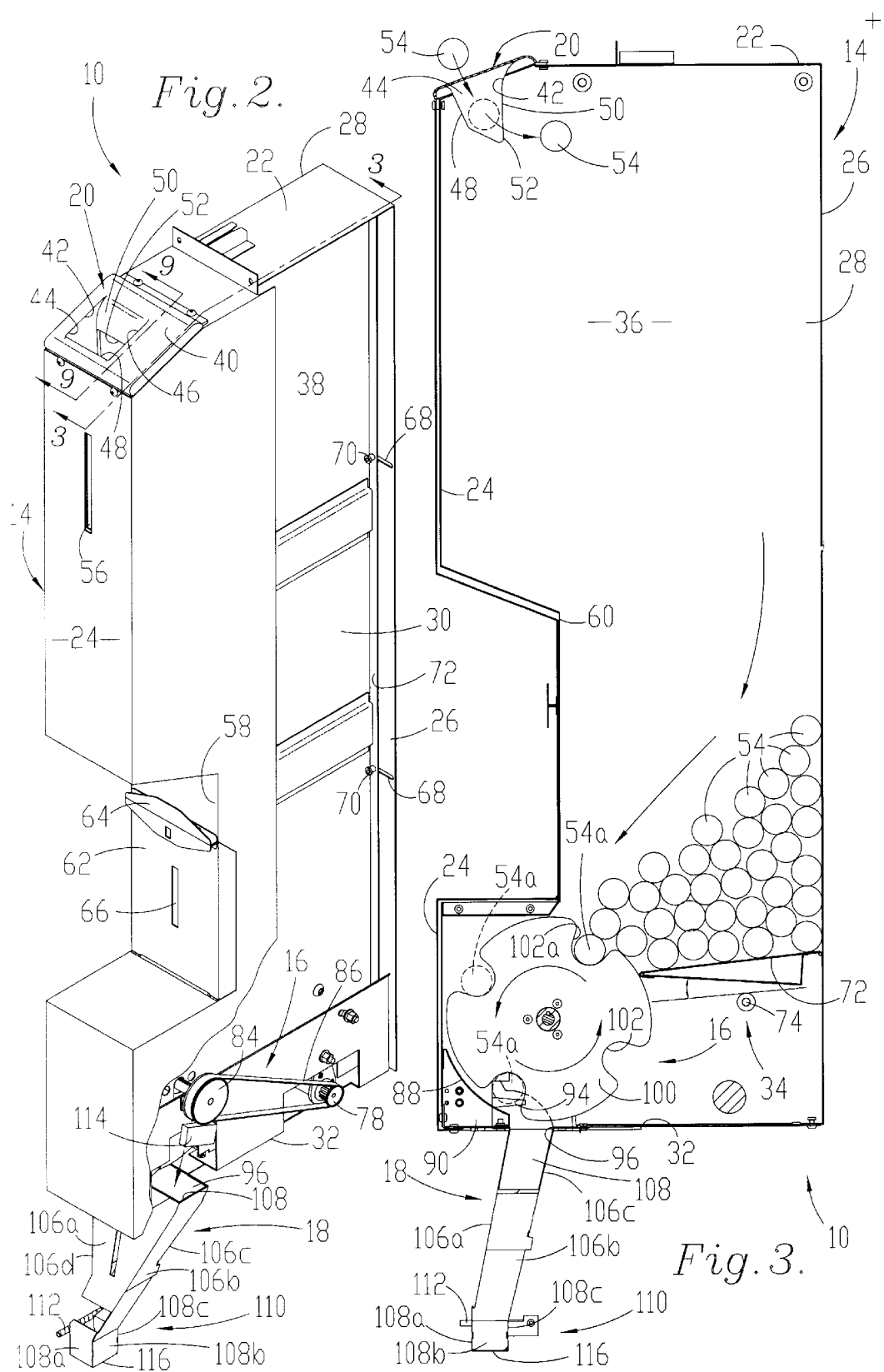

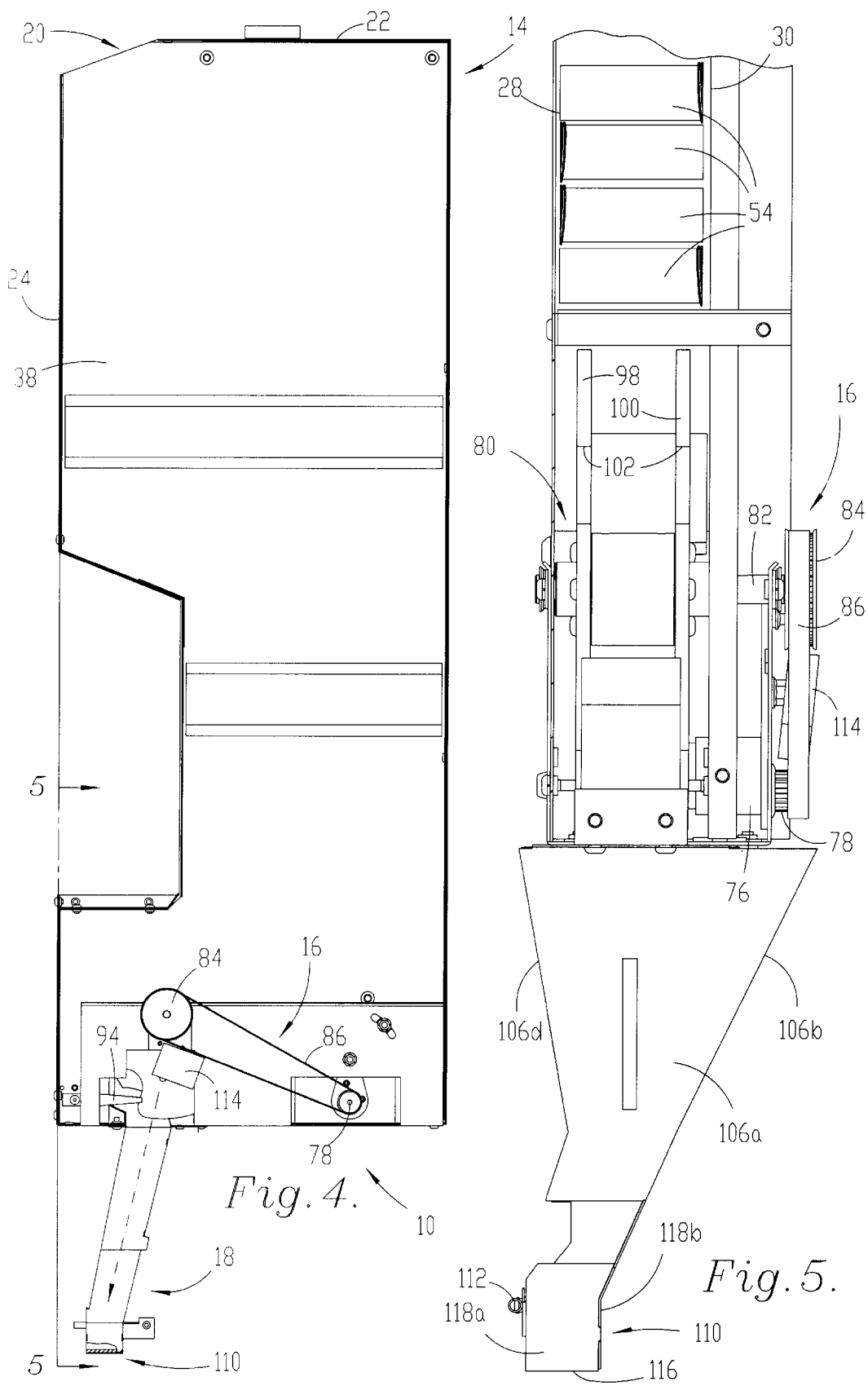

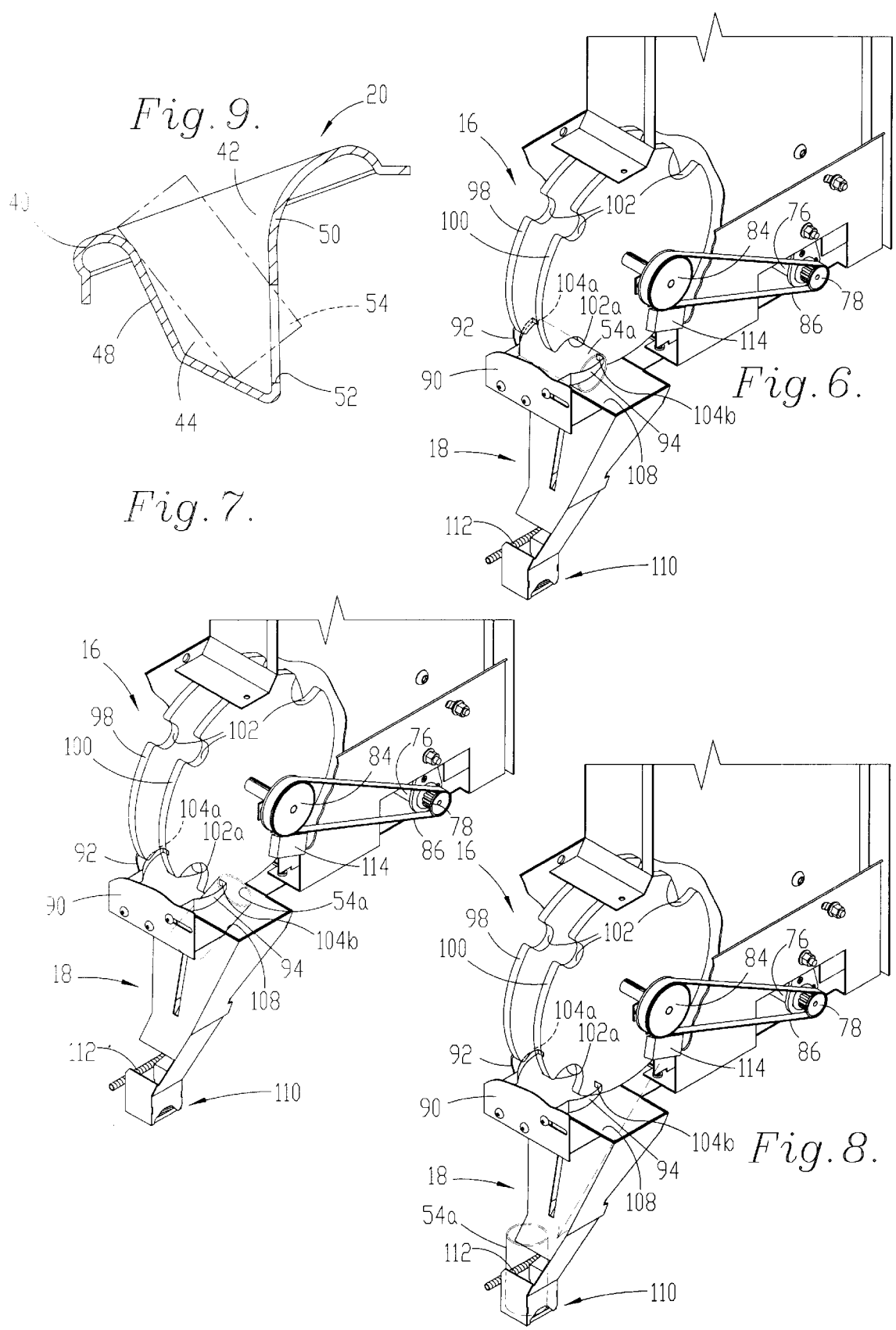

MEDICINE VIAL DISPENSER

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the field of object dispensing mechanisms. In particular, the invention is concerned with a medicine vial dispensing apparatus that receives open top, medicine vials from storage in a horizontal orientation and delivers the vials for use in a substantially upright orientation.

2. Description of the Prior Art

In the field of medical prescription dispensing devices, it is necessary to present an empty medicine vial in an upright orientation for filling by a medicament. U.S. Pat. No. 5,337,919 discloses a rotating wheel with pick-up arms that plunge through a mass of randomly oriented vials. If a pick-up arm encounters the open top of a vial, the arm enters the vial, lifts it and then discharges the vial in the upright orientation through a chute to a platform for grasping by a vial manipulator. While generally adequate, the dispensing mechanism of the '919 patent and other prior art mechanisms do not present the high degree of reliability necessary for the prescription dispensing field.

SUMMARY OF THE INVENTION

The present invention solves the prior art problems discussed above and presents a distinct advance in the state of the art. In particular, the medicine vial dispenser hereof is highly reliable in dispensing empty vials in an upright orientation for subsequent filling by medicament.

The preferred embodiment includes a housing configured for receiving and storing medicine vials in a substantially axially horizontal storage orientation, and a dispensing mechanism for receiving a vial in the storage orientation from the housing and delivering the object in a substantially upright orientation to a support assembly. The preferred housing includes loading structure that allows vials to be loaded into the housing in the storage orientation and prevents loading in any other orientation. Housing side walls are precisely spaced to maintain the vials in the storage orientation while preventing vials from rotating and wedging between the walls.

The preferred dispensing mechanism includes a selectively rotatable wheel with slots configured for receiving a vial in the storage orientation from the housing and for placing the vial in this orientation between a pair of spaced, resilient arms having respective inwardly extending prongs. The prongs are configured and spaced so that the closed end of the vial slides by one of the prongs while the other prong holds the interior edge of the vial open top until the vial attains a substantially upright orientation. With this structure, a vial can be delivered in the upright orientation upon receipt of a vial having the open top extending in either direction. Other preferred aspects of the invention are disclosed herein.

BRIEF DESCRIPTION OF THE DRAWINGS

FIG. 1 is a front view of a prescription dispensing machine incorporating three of the preferred medicine vial dispenser apparatus in accordance with the present invention;

FIG. 2 is a top left pictorial view of the preferred medicine vial dispenser apparatus of FIG. 1 with portions cut away for clarity of illustration;

FIG. 3 is a sectional view taken along line 3—3 of FIG. 2;

FIG. 4 is a side elevational view with the side cover removed of the dispenser apparatus of FIG. 2;

FIG. 5 is a front elevational view with the cover removed of the dispenser apparatus of FIG. 2;

FIG. 6 is a partial, top left pictorial view of the dispensing mechanism of the apparatus of FIG. 2 with portions cut away for clarity of illustration showing a vial being presented for dispensing;

FIG. 7 is a view similar to FIG. 6 but showing a vial upon rotation to a substantially upright orientation;

FIG. 8 is a view similar to FIG. 7 but showing a vial in the upright orientation on the support platform; and FIG. 9 is a partial sectional view taken along line 9—9 of FIG. 2.

DETAILED DESCRIPTION OF THE PREFERRED EMBODIMENT

FIG. 1 illustrates three of the preferred medicine vial dispensing apparatus 10 shown in the preferred environment of use as part of a automatic prescription dispensing machine 12. The preferred apparatus 10 is designed for dispensing vials of one size and three apparatus 10 are illustrated in FIG. 10 for dispensing vials of three different sizes, respectively. Machine 12 is preferably the type illustrated in U.S. Pat. No. 5,337,919, hereby incorporated by reference as part of the disclosure hereof.

Referring to FIG. 2, apparatus 10 broadly includes housing 14, dispensing mechanism 16 and support assembly 18. Housing 14 includes loading structure 20 fitted in housing upper wall 22, and further includes front wall 24, rear wall 26, left wall 28, adjustable right wall 30, lower wall 32, and interior shelf assembly 34, all cooperatively defining vial storage compartment 36. Housing 14 further includes removable facia 38.

Loading structure 20, as best viewed in FIGS. 2, 3 and 9, includes top wall 40 with loading recess 42 defined therein by spaced opposed entry walls 44 and 46, arcuate chute wall 48 and opposed aperture wall 50. Entry walls 44 are spaced slightly greater than the height of a vial. Aperture wall 50 includes vial aperture 52 extending between entry walls 44, 46. Aperture 52 presents a height slightly greater than the diameter of a vial. Chute wall 48 extends in arcuate fashion from the front of recess 42 to the rear thereof adjacent the lower side of aperture 52.

With this configuration, a vial 54 can be loaded into housing 14 by placing it into loading recess 42 in a substantially axially horizontal storage position as illustrated in FIG. 3. Chute wall 48 guides vial 54 as it rolls or slides toward vial aperture 52 with entry walls 44 helping to maintain this orientation.

The configuration of aperture wall 50 aids in ensuring that a vial enters housing 14 in the storage orientation and in preventing a vial from entering in any orientation other than axially horizontal. Moreover, as illustrated in FIG. 9, the design of chute wall 48 (in cooperation with the other components of loading structure 20) prevents entry of vial 54 with its axis transverse to that of vial aperture 52. Thus, loading structure 20 allows entry of a vial only in the storage orientation with the vials axially parallel to vial aperture 52 and thereby with one another, and prevents loading in any other orientation. However, for convenience during loading, this design does allow the vials to be loaded with the open top oriented toward the left or the right as viewed from the front of apparatus 10.

Front wall 24 includes slotted viewport 56 defined therein for viewing the level of vials in housing 14, and further includes an indented section 58 presenting access opening 60 covered by access door 62 hingedly coupled at the lower edge thereof with front wall 24. Door 62 opens outwardly and downwardly and includes handle 64 and viewport 66 defined therein.

Left wall 28 extends between front wall 24 and rear wall 26 adjacent the left edges thereof (as viewed in FIGS. 1 and 2) and is positioned generally in the same plane as entry wall 44 of loading structure 20. Right side wall 30 extends between front wall 24 and rear wall 26 adjacent the right edges thereof but is adjustable relative to left wall 28. As shown in FIG. 2, rear wall 26 includes a plurality of horizontal slots 68. A plurality of screws 70 extend through flange 72 of right side wall 30 in registration with slots 68 allowing wall 32 to be adjusted relative to left wall 28 and secured at the desired spacing therebetween.

The spacing between side walls 28, 30 is adjusted to be slightly greater than the height of a vial to be stored therebetween in order to allow facile movement of vials. This spacing is preferably between about 0.1 and 0.2 inches greater than the height of a vial. Additionally, side walls 28, 30 are spaced closely enough so that a vial cannot rotate and wedge between the walls. The maximum spacing is preferably no more than 0.25 inches greater than the height of a vial to be stored.

As illustrated in FIG. 3, interior shelf assembly 34 includes shelf 72 hingedly coupled with rear wall 36 and stop 74 extending between left and right side walls 28, 30 and coupled with left wall 28. As discussed further herein, shelf 72 moves up and down during operation of dispensing mechanism 16 as an aid in preventing vials 54 from bridging within housing 14. In the downward position, shelf 72 is at an angle below horizontal relative to mechanism 16 so that vials 54 roll toward mechanism 16.

Referring to FIGS. 2–8, dispensing mechanism 16 is generally located in the lower portion of housing 14 between access door 62 and lower wall 32. Mechanism 16 includes gear motor 76 presenting drive sheave 78 on the output thereof, rotatable dispensing wheel 80 having shaft 82 presenting driven sheave 84, cogged belt intercoupling sheaves 78 and 84, guidewall 88, and bracket 90 supporting spaced left resilient arm 92 and right resilient arm 94 above discharge opening 96 defined in lower wall 32.

Dispensing wheel 80 includes left wheel section 98 and right wheel section 100 spaced from wheel section 98, with both mounted on shaft 82 so that the outboard surfaces are spaced by a distance about 75% of the height of vials 54. Each section 98, 100 includes a plurality of slots 102 in registration defined in the periphery thereof with each registered pair of slots 102 configured to receive and hold a vial 54 therein. Arcuate guide wall 88 extends between front wall 24 near the lower end thereof and lower wall 32 near the forward end thereof and is configured to retain vials 54 in slots 102 and guide them toward arms 92, 94 as wheel 80 rotates.

Arms 92, 94 are preferably composed of spring steel for resiliency and spaced by a distance slightly greater than vial 54. Arms 92, 94 also include respective, inwardly extending prongs 104a and 104b positioned directly above discharge opening 96 and positioned within the outer radius of wheel 80 at about the midpoint of slots 102 in order to engage a vial 54 therein at about the center line of the vial. The resilient nature of arms 92, 94 biases prongs 104a and 104b toward one another.

Support assembly 18 includes walls 106a, 106b, 106c and 106d defining discharge chutes 108, support cage 110, holding spring 112 and conventional photoelectric eye 114. The upper end of chute 108 is coincident with discharge opening 96 and narrows from this opening toward cage 110. Inspection slot 111 is defined in wall 106a for visual inspection of chute 108 and correction of any blockage therein.

Cage 110, sized to hold and retain a vial in the upright position, is spaced from the lower end of chute 108 and includes bottom support wall 116 and three side walls 118a, 118b and 118c with side wall 118b being an extension of chute wall 106b. Holding spring 112 extends across the open side 120 of cage 110. Chute wall 106d terminates short of the lower end thereof and above the top of a vial positioned in support cage 110. Photoelectric eye 114 is conventional in nature and positioned above discharge opening 96 with a field of view extending through chute 108 to support wall 116 for use in verifying the presence or absence of a vial in cage 110.

In use, an attendant removes empty vials 54 from a shipping carton and inserts them in the substantially horizontal storage position into loading recess 42 of loading structure 20. Chute wall 48 and entry walls 46 guide the vials 54 in this position through aperture wall 50 whereupon vials 54 enter housing 14.

Vials 54 are guided by left wall 28 and right wall 32 and maintained in the storage position within compartment 36 as they come to rest on shelf 72 or on other vials supported by shelf 72.

When a vial 54 is needed for filling, conventional controls activate drive motor 76 in order to rotate dispensing wheel 80 until sensor 114 detects the presence of a vial which is about the amount of rotation from one pair of slots 102 to the next. During operation, drive motor 76 reverses for about 0.4 seconds out of about every 7 seconds in order to ensure that a vial does not partially jam in wheel 80 which in turn would cause jamming of mechanism 16.

As wheel 80 rotates, the distal end of hinged shelf 72 rides on the periphery of wheel 80 until encountering a pair of slots designated slots 102a in FIG. 3 and in FIGS. 6–8. Shelf 72 then drops down until it engages stop 74. This presents shelf 72 at an angle below horizontal allowing a vial 54a to roll into slots 102a as wheel rotates. The dropping of shelf 72 into slots 102a also shakes the mass of stored vials ensuring that they do not bridge or hang up within compartment 36.

As wheel 80 rotates counter-clockwise as viewed in FIG. 3, slots 102a carry vial 54a therein, still in the storage position. As slots 102a reach the horizontal position, front wall 24 maintains vial 54a therein. Subsequently, guide wall 86 maintains vial 54a in slots 102a until reaching prongs 104a,b at the bottom of the rotation. At this position, dispensing wheel 80 places vial 54 between prongs 104a,b.

During rotation of dispensing wheel 80, prongs 104a,b ride along respective outboard sides of wheel sections 98, 100 adjacent the periphery thereof. When a pair of slots 102 is encountered, the resilient nature of arms 92, 94 causes prongs 104*a,b* to move into the respective slots 102. If a vial is present in the slots as illustrated in FIG. 6, prongs 104*a,b* engage the vial. In particular, FIG. 6 illustrates vial 54*a* with the closed end on the left side and the open end on the right side. With this orientation, prong 104*a* engages the closed end of vial 54*a* and prong 104*b* enters the open end. Also, prong 104*a*, engaging the closed end of vial 54, pushes vial 54*a* toward prong 104*b*.

In the position shown in FIG. 6, vial 54*a* is no longer supported by guide wall 88 and the closed end of vial 54*a* slips by prong 104*a*. The open end of vial 54*a* also slips until prong 104*b* engages the interior of the peripheral edge of vial 54*a*, thereby supporting the open end of the vial. This allows vial 54*a* to rotate to a substantially upright orientation as illustrated in FIG. 7. As this orientation is achieved, the open end of vial 54*a* is no longer supported by prong 104*b* and the vial slips off, falls through discharge opening 96, and slides down chute 108.

It will be appreciated that this same result occurs if a vial is placed between prongs 104*a,b* with the closed end and open end reversed. The open end is still supported by one of the prongs while the closed end slips by the other of prongs to rotate the vial to a substantially upright position.

The gradual narrowing of chute 108 guides vial 54*a* into cage 110 with the closed end of the vial resting on support wall 116. Cage walls 118*a,b,c* and spring 112 hold vial 54 in the upright orientation as shown in FIG. 8. Vial 54*a* is now presented in the upright position for removal through the open side of cage 110 with spring 112 flexing to allow the removal of the vial, such as by a manipulator arm disclosed in the '919 patent. Photoelectric eye 114 detects the presence of a vial in cage 110 and provides a signal to the control system indicative thereof, whereupon the control system deactivates motor 76. When another vial is needed, the process described above is repeated. Typically, as soon as eye 114 signals the absence of the vial, the process is initiated so that a vial is always present in cage 110.

Those skilled in the art will appreciate that the present invention encompasses many variations in the preferred embodiment described herein. For example, apparatus 10 could be configured to accommodate vials with deviations in diameter and height. Moreover, the utility of the present invention is not limited to medicine vials, but could be used with other cylindrical objects such as soft drink cans having one end relatively smooth to slip by one of the prongs and the other end having a ridge of some sort for engagement by the other of the prongs. The location of sensor 114 at the top of chute 108 allows detection of a vial jam in chute 108. If photoelectric eye 114 detects a vial but the gripper of a robot arm does not detect the presence of a vial in cage 110, then a vial must be wedged in chute 108 and an alarm condition is sindicated calling for manual correction. This can be easily accomplished by inserting a rod in slot 111 to dislodge the wedged vial.

Having thus described the preferred embodiments of the present invention, the following is claimed as new and desired to be secured by Letters Patent:

We claim:

1. An object dispensing apparatus for dispensing cylindrically shaped objects having a relatively smooth base end and a top end having a circumscribing edge, and presenting an object height, said apparatus comprising:

a housing configured for receiving a plurality of the objects and for storing the objects in a substantially axially horizontal storage orientation;

dispensing means for receiving an object from said housing in said storage orientation and for dispensing the object in a substantially upright orientation; and support means for receiving an object from said dispensing means and for supporting the object in said upright orientation, said housing including loading means for allowing loading of an object into said housing in said storage orientation and for preventing loading of an object into said housing in some other orientation.

2. The apparatus as set forth in claim 1, said housing including opposed side walls positioned for receiving objects from said entry means in said storage orientation and configured for maintaining the objects in said storage orientation, said walls being spaced slightly greater than the object height sufficiently for allowing facile movement of the object between said walls and less than a distance that would allow an object to rotate and wedge between said side walls.

3. The apparatus as set forth in claim 2, said walls being spaced at least about 0.1 inches greater than the object height and less than about 0.25 inches greater than the object height.

4. An object dispensing apparatus for dispensing cylindrically shaped objects having a relatively smooth base end and a top end having a circumscribing edge, and presenting an object height, said apparatus comprising:

a housing configured for receiving a plurality of the objects and for storing the objects in a substantially axially horizontal storage orientation;

dispensing means for receiving an object from said housing in said storage orientation and for dispensing the object in a substantially upright orientation; and support means for receiving an object from said dispensing means and for supporting the object in said upright orientation, said dispensing means including a pair of spaced, axially aligned and shiftable prongs biased toward one another and oriented substantially horizontally, and a delivery mechanism having means for receiving an object from said housing in said storage orientation and for placing and releasing the object between and axially aligned with said prongs, said prongs being configured and spaced so that one of said prongs contacts the base end of an object therebetween and the other of said prongs engages the top end within the periphery of the edge, and so that said base end slides by said one of said prongs while the other of said prongs engages the interior of the edge until the object attains a substantially upright orientation whereupon the object slips from the other of said prongs.

5. The apparatus as set forth in claim 4, said delivery mechanism including a selectively actuatable, rotatable wheel in contact with objects stored in said housing, positioned between said prongs, having a width about 75% of the object height, and including slots defined in the periphery thereof configured for receiving an object therein from the housing and for carrying the object to said prongs and placing the object therebetween.

6. The apparatus as set forth in claim 4, said dispensing means including a pair of spaced resilient arms respectively including said prongs extending therefrom.

7. The apparatus as set forth in claim 6, said housing being configured to store the objects with some having the top end extending in one direction and others having the top end extending in the opposed direction, said rotatable wheel being configured for placing an object between said prongs in either of said directions, said prongs being configured for delivering objects in said upright orientation upon receipt of the objects in either of said directions.

8. A medicine vial dispensing apparatus for dispensing cylindrically shaped medicine vials having a relatively smooth closed end and an open end having a circumscribing edge, and presenting a vial height, said apparatus comprising:
 a housing configured for receiving a plurality of the vials and for storing the vials in a substantially axially horizontal storage orientation;
 dispensing means for receiving a vial from said housing in said storage orientation and for dispensing the vial in a substantially upright orientation; and
 support means for receiving a vial from said dispensing means and for supporting the vial in said upright orientation,
 said housing including
  loading means for allowing loading of an object into said housing in said storage orientation and for preventing loading of an object into said housing in some other orientation,
  opposed side walls positioned for receiving objects from said entry means in said storage orientation and configured for maintaining the objects in said storage orientation, said walls being spaced at least about 0.1 inches greater than the object height and less than about 0.25 inches greater than the object height,
 said dispensing means including
  a pair of spaced, axially aligned and shiftable resilient arms respectively including prongs biased toward one another and oriented substantially horizontally, and
  a selectively actuatable, rotatable wheel in contact with objects stored in said housing, positioned between said prongs, having a width about 75% of the object height, and including slots defined in the periphery thereof configured for receiving an object therein from the housing and for carrying the object to said prongs and placing the object therebetween,
 said prongs being configured and spaced so that one of said prongs contacts the base end of an object therebetween and the other of said prongs engages the top end within the periphery of the edge, and so that said base end slides by said one of said prongs while the other of said prongs engages the interior of the edge until the object attains a substantially upright orientation whereupon the object slips from the other of said prongs and is thereby delivered to said support means in said upright orientation.

* * * * *